United States Patent [19]

Kidd

[11] Patent Number: 4,848,829
[45] Date of Patent: Jul. 18, 1989

[54] DOOR TRIM PANEL ASSEMBLY

[75] Inventor: Richard L. Kidd, Stow, Ohio

[73] Assignee: General Motors Corporation, Detroit, Mich.

[21] Appl. No.: 112,456

[22] Filed: Oct. 26, 1987

[51] Int. Cl.$^4$ .............................................. B60J 5/00
[52] U.S. Cl. ..................................... 296/152; 49/502; 174/72 A; 174/72 TR; 296/39.1
[58] Field of Search ....................... 296/146, 152, 39.1; 49/502; 439/34, 492, 495, 494, 498, 499; 174/72 A, 72 TR

[56] References Cited

U.S. PATENT DOCUMENTS

| | | | |
|---|---|---|---|
| 3,009,010 | 11/1961 | Stearns et al. | 174/72 A |
| 3,999,826 | 12/1976 | Yurtin | 439/495 |
| 4,000,558 | 1/1977 | Cahill | 174/72 A X |
| 4,065,199 | 12/1977 | Andre et al. | 439/498 |
| 4,306,381 | 12/1981 | Presto | 49/502 |
| 4,474,420 | 10/1984 | Nestor | 439/498 |

FOREIGN PATENT DOCUMENTS

| | | | |
|---|---|---|---|
| 3530413 | 2/1987 | Fed. Rep. of Germany | 296/146 |
| 0000912 | 1/1982 | Japan | 296/146 |
| 114720 | 8/1984 | Japan | 296/146 |
| 2164609 | 3/1986 | United Kingdom | 296/146 |
| 2166603 | 5/1986 | United Kingdom | 439/34 |

OTHER PUBLICATIONS

Xerox Disclosure Journal, Cable Harness, Jan./Feb. 1980, vol. 5, No. 1, p. 67.
Scotch Link Connector Tape, Brochure.

Primary Examiner—Dennis H. Pedder
Attorney, Agent, or Firm—Charles E. Leahy

[57] ABSTRACT

A door trim panel assembly is comprised of a rigid trim panel having a decorative trim material attached on the inner face thereof. A sheet of flexible plastic or other electrically non-conductive material is imprinted with foil conductor strips to comprise a printed electrical circuit and is attached to the outer face of the rigid trim panel. The flexible plastic sheet is coextensive in size with the rigid trim panel so that the plastic sheet will provide a vapor barrier. The rigid door trim panel is comprised of plastic or hardboard or some other dielectric material so that the foil conductor strips are electrically insulated from one another by the rigid trim panel. The flexible plastic sheet insulates the foil conductor strips from the metal of the door inner panel. The foil conductor strips have terminal devices at the ends thereof for connection to the various electrical devices mounted in the door cavity and to various switches which are mounted on the trim panel assembly for operating the electric windows and other electric devices. The door trim panel assembly may be mounted on the door either manually by an assembly worker or robotically.

1 Claim, 1 Drawing Sheet

DOOR TRIM PANEL ASSEMBLY

The invention relates to a door trim panel assembly for the inside of a vehicle door and more particularly provides a door trim panel having integral vapor barrier and printed electric circuit.

BACKGROUND OF THE INVENTION

It is well known in motor vehicles to construct a vehicle door including spaced apart inner and outer panels defining a cavity for mounting the window, window regulator, door latches, and seat belt retractors, as well as the electrical devices such as motors and switches associated therewith. These devices are installed inside the door cavity through a plurality of access openings provided in the door inner panel.

The inner panel of the door is trimmed by a trim panel assembly which conceals the access openings and presents a pleasing appearance to the vehicle occupant. The door trim panel assembly is conventionally comprised of a rigid panel, such as molded plastic or pressed hardboard, which is covered with a flexible decorative trim material such as cloth, vinyl, leather or carpeting. A vapor barrier material, such as sheet plastic or heavy paper, is installed between the door trim panel assembly and the door inner panel to prevent water vapor from migrating from the door into the passenger compartment. The door trim panel assembly is attached to the door by suitable fasteners so that the vapor barrier is trapped between the door trim panel assembly and the door inner panel. Various switches such as the power window switch, are mounted on the door trim panel assembly and connected to the window regulator motor by electrical wiring which is inserted through holes in the door trim panel assembly and the vapor barrier.

It would be desirable to develop a door trim panel assembly which would be constructed as a modular unit including the rigid panel, trim fabric, and electrical wiring in order to facilitate the installation of these components on the vehicle door, particularly by a robot.

SUMMARY OF THE INVENTION

According to the invention a door trim panel assembly is comprised of a rigid trim panel having a decorative trim material attached on the inner face thereof. A sheet of dielectric material, such as flexible plastic, is imprinted with foil conductor strips to comprise a printed electrical circuit and is attached to the outer face of the rigid trim panel. The flexible plastic sheet is coextensive in size with the rigid trim panel so that the plastic sheet will provide the vapor barrier. The rigid door trim panel is comprised of plastic or hardboard or some other dielectric material so that the foil conductor strips are electrically insulated from one another by the rigid trim panel. The flexible plastic sheet insulates the foil conductor strips from the metal of the door inner panel. The foil conductor strips have terminal devices at the ends thereof for connection to the various electrical devices mounted in the door cavity and to various switches which are mounted on the trim panel assembly for operating the electric windows and other electric devices. The door trim panel assembly may be mounted on the door either manually by an assembly worker or robotically.

BRIEF DESCRIPTION OF THE DRAWINGS

These and other features will be readily apparent from the following specification and drawings wherein.

DESCRIPTION OF THE PREFERRED EMBODIMENT

Figure 1:
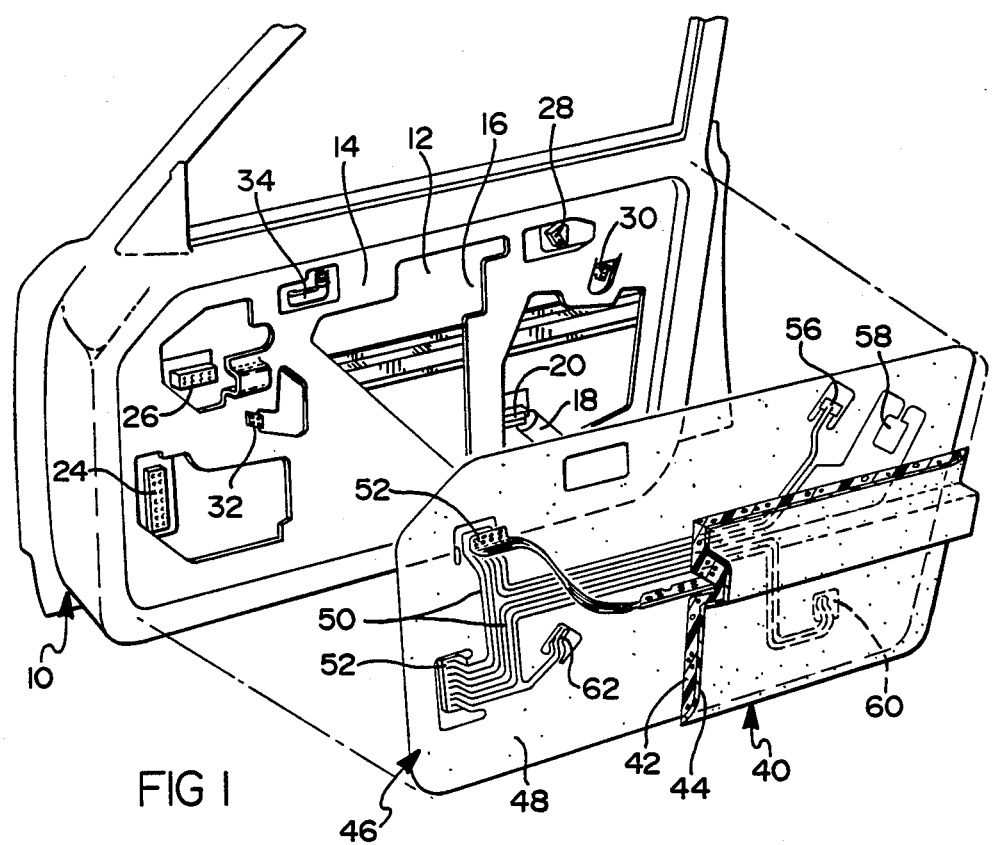
FIG. 1 is an exploded view of a vehicle door according to the invention and showing the door trim panel assembly with parts broken away and in section.

Referring to FIG. 1 there is shown a vehicle body door generally indicated at 10 and comprised of a stamped sheet metal outer panel 12 and a stamped sheet metal inner panel 14. The outer panel 12 and the inner panel 14 are welded and hem flanged together to define the door 10 and provide a cavity 16 between the inner and outer panels.

A window panel, not shown, is mounted in the cavity 16 by a window regulator which raises and lowers the window panel. The window regulator includes an electric motor 18 which carries an electrical connector 20 having a plurality of electrical contacts for receiving electrical power to selectively energize the motor 18 to raise and lower the window.

A plurality of additional electric connectors 24, 26, 28, 30 and 32 are mounted in the cavity 16 of the door and electrically connected to various door mounted devices such as an outside rear view mirror, the door latch, seat belt retractor and to the battery, not shown, mounted on the vehicle body.

As seen in FIG. 1, the inner panel 14 has a plurality of access openings provided therein through which the cavity 16 is accessible to enable installation of the door mounted devices and the electrical connector terminals 20, 24, 26, 28, 30 and 32. The door 10 also has an inside door handle 34 which is operable to unlatch the door for opening movement.

A door trim panel assembly, generally indicated at 40, is provided for trimming the inside of the door and concealing the access openings 16.

Figure 2:
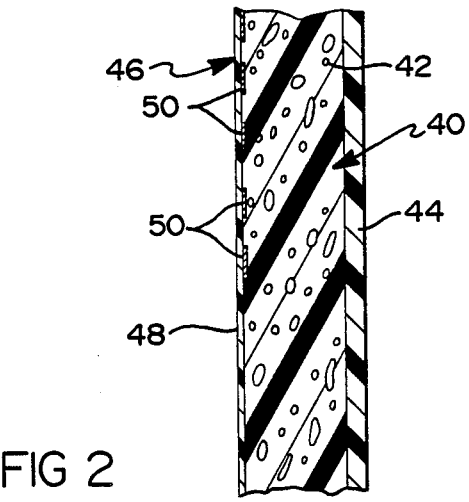
FIG. 2 is a sectional view taken throgh the door trim panel assembly.

The door trim panel assembly 40 includes a rigid trim panel 42 and a decorative trim material 44 attached to the inner surface thereof. The rigid trim panel 40 is shown in FIG. 2 as of foamed plastic, but may be constructed of pressed wood particle, pressed carboard, solid molded vinyl, or any other suitable rigid but electrically non-conductive material. The decorative trim material 44 is shown as vinyl material but may be leather, cloth or carpeting or some other decorative sheet material. Furthermore, the decorative trim surface may be provided by the integral skin surface of the rigid trim panel 42.

The trim panel assembly 40 also includes an integral vapor barrier and printed circuit 46 which is comprised of a sheet of electrically non-conductive or dielectric material, such as flexible plastic sheet 48 having a plurality of strips of electrical conducting foil conductor strips 50 imprinted thereon. The foil conductor strips 50 end at terminating devices such as connector plugs 52, 54, 56, 58, 60 and 62 which are adapted to plug into the connectors 20, 24, 26, 28, 30, and 32 mounted in the cavity 16 of the door 10. As seen in FIG. 1, the flexible plastic sheet 48 which carries the foil conductor strips 50 is generally coextensive in size with the rigid trim panel 42 so that the flexible plastic sheet will serve as a vapor barrier when the door trim panel assembly 40 is installed on the door 10.

Furthermore, as best seen in FIG. 2, the foil conductor strips 50 are positioned between the flexible plastic sheet 48 and the foam plastic of rigid trim panel 42 so that the foil conductor strips 50 are electrically insulated from one another and from the metal inner door panel 14 and from the occupant.

As best seen by referring to FIG. 1, the door trim panel assembly of this invention provides facilitated assembly of the door 10 in that the vapor barrier and electrical circuitry are integral with the door trim panel assembly 40 and the electrical connectors are automatically coupled when the door trim panel assembly 40 is installed onto the door 10. Accordingly, this construction of the door trim panel assembly facilitates assembly by a robot. The door trim panel assembly 40 may be secured on the door by using screws, push in fasteners or other suitable fasteners. These added fasteners also serve as a connector positioning assurance mechanism for the electrical connectors.

As seen in FIG. 2, the door trim panel assembly may be integrally molded together by placing the decorative trim panel material 44 on one side of a mold, placing the flexible plastic sheet 48 or other sheet of non-conductive material having the foil strips printed thereon on the other surface of the mold, and then injecting the plastic foam 42 therebetween in order to form the trim panel assembly 40. Furthermore, in those instances where the plastic foam 46 or other plastic trim panel construction, has integral vapor barrier capability, it may be possible to embed the conductors directly into the trim panel without need for a separate plastic sheet 48 carrying the conductors.

Thus it is seen that the invention provides a new and improved door trim panel assembly having integral vapor barrier and printed circuit integral therewith.

I claim:

1. A decorative trim panel assembly adapted for installation upon the inner face of an electrically conductive vehicle door having inner and outer panels spaced apart to define a door cavity housing a plurality of electrical devices mounted therein, comprising:

a rigid trim panel of electrically non-conductive material having an outer surface adapted for attachment on the door inner panel and an inner surface, a decorative trim carried on the inner surface of the rigid trim panel to decoratively trim the inner surface of the door facing an occupant compartment, a vapor barrier of sheet plastic electrically non-conductive material mounted on the outer surface of the rigid trim panel prior to the installation of said assembly on the door and being generally coextensive in size with the trim panel and the decorative trim so that the sheet of flexible plastic provides a vapor barrier preventing migration of moisture from the door cavity to the passenger compartment, and said vapor barrier of sheet plastic material having a printed circuit thereon including a plurality of strips of electrical conducting foil imprinted on said vapor barrier and facing the rigid trim panel so that the foil conducting strips are electrically insulated from one another and from the door by the rigid trim panel and the vapor barrier of sheet plastic material.

* * * * *